United States Patent [19]

Wilson, III

[11] 4,060,362
[45] Nov. 29, 1977

[54] INJECTION MOLDING SAME CYCLE CONTROL

[75] Inventor: Charles Eugene Wilson, III, Rochester, Minn.

[73] Assignee: International Business Machines Corporation, Armonk, N.Y.

[21] Appl. No.: 576,518

[22] Filed: May 12, 1975

[51] Int. Cl.² .......................................... B29F 1/06
[52] U.S. Cl. .................................... 425/145; 425/149
[58] Field of Search .............. 425/140, 141, 142, 145, 425/146, 147, 149, 157; 91/422, 459

[56] References Cited

U.S. PATENT DOCUMENTS

| | | | |
|---|---|---|---|
| 3,767,339 | 10/1973 | Hunkar | 425/149 |
| 3,773,451 | 11/1973 | Bielfeldt et al. | 425/147 |
| 3,799,719 | 3/1974 | Bonikowski et al. | 425/149 |
| 3,825,386 | 7/1974 | Bello et al. | 425/135 X |
| 3,840,312 | 10/1974 | Paulson et al. | 425/149 |
| 3,859,400 | 1/1975 | Ma | 425/145 |
| 3,860,801 | 1/1975 | Hunkar | 425/149 |
| 3,893,792 | 7/1975 | Laczko | 425/149 |
| 3,920,367 | 11/1975 | Ma et al. | 425/149 |
| 3,932,083 | 1/1976 | Boettner | 425/149 X |
| 3,941,534 | 3/1976 | Hunkar | 425/149 X |

Primary Examiner—Francis S. Husar
Assistant Examiner—W. R. Briggs
Attorney, Agent, or Firm—Robert W. Lahtinen

[57] ABSTRACT

The disclosure is directed to a combined same cycle and subsequent cycle control of an injection molding machine. Mold cavity pressure readings are accumulated and averaged during an initial cycle portion to generate a sensed average value which is compared to a setpoint reference to test for an error. The error signal so generated is used to immediately vary the hydraulic pressure driving the injection ram during the same cycle of machine operation to cause the sensed pressure profile to be corrected to a reference pressure profile. A further correction to the hydraulic pressure is enabled as cavity pressure readings are continued to a later event, averaged, and the resulting sensed value compared to a setpoint reference to enable a further correction to be implemented during the same cycle although its effect on the process is principally effective in the next subsequent cycle.

7 Claims, 6 Drawing Figures

INJECTION MOLDING SAME CYCLE CONTROL

BACKGROUND OF THE INVENTION

Although an injection molding machine may be controlled using preestablished settings of parameters such as hydraulic pressure to the ram, material temperature and cycle time, it has been found that to produce molded parts of consistent uniform quality it is necessary to provide for continued monitoring of process variables and to effect correction as required.

A common control technique is to monitor cavity pressure throughout the molding cycle. By establishing a pressure profile which is representative of an "ideal" cycle during which a molded part of desired quality is produced and using such profile as a reference, process conditions during subsequent cycles may be compared and corrective action taken to cause the subsequent cycle pressure profiles to conform to the reference profile. Although it is recognized that the more promptly corrective action is taken in response to a sensed error condition, the greater the uniformity of repetitive cycles it has previously been possible to take effective corrective action only in a subsequent machine cycle. Some process control techniques make reference to control during the same cycle by altering conditions within the same machine cycle. These actions usually amount to resetting a valve which is no longer controlling the active part of the process. Such systems provide effective control of process parameters only during the subsequent cycle.

SUMMARY OF THE INVENTION

The control of the present invention is a true same cycle control in that the hydraulic fluid pressure to the cylinder connected to the ram which forces the plasticized melt into the mold cavity is corrected as necessary during the same cycle that an error is sensed. This causes the material cavity pressure profile to conform to a reference cavity pressure profile. Cavity pressure is sensed for a selected portion of a cycle accumulated and averaged, and the resulting sensed average cavity pressure is compared to a reference value to generate an error signal. The error signal is used to adjust the pressure control valve to provide an adjustment to the system hydraulic pressure during the remainder of the same cycle, which correction increases or decreases the pressure in accordance with the sign of such error signal by an incremental amount which is a function of the error signal magnitude.

Also taught by this invention is the use of a subsequent cycle correction which is combined with the above same cycle correction for further "fine tuning" the injection molding system. Although this second sensing, comparison and correction is effected and implemented during the same cycle, it is after the fact. The effect is principally to make the correction to the next cycle portion during which the corrected pressure is applied. This second correction is implemented by a second series of pressure readings which is averaged and compared to a second reference or setpoint value. Although these readings may be mutually independent of the first series, it is more common practice to use part or all of the first series and continue to accumulate readings throughout the meaningful portion of the cavity pressure profile.

This same cycle or combined same and subsequent cycle control is applicable both in a two stage injection press using hydraulic cutover as described in the specification which follows or with a single stage press. In a two stage press it is possible to control either the injection portion or the holding portion of the cycle.

By making immediate corrections to the operating parameters during the remaining portions of the same cycle during which an error condition was sensed the technique of the present invention enables the taking of more immediate corrective action than has heretofore been possible with prior art molding control systems.

DETAILED DESCRIPTION

Figure 1:
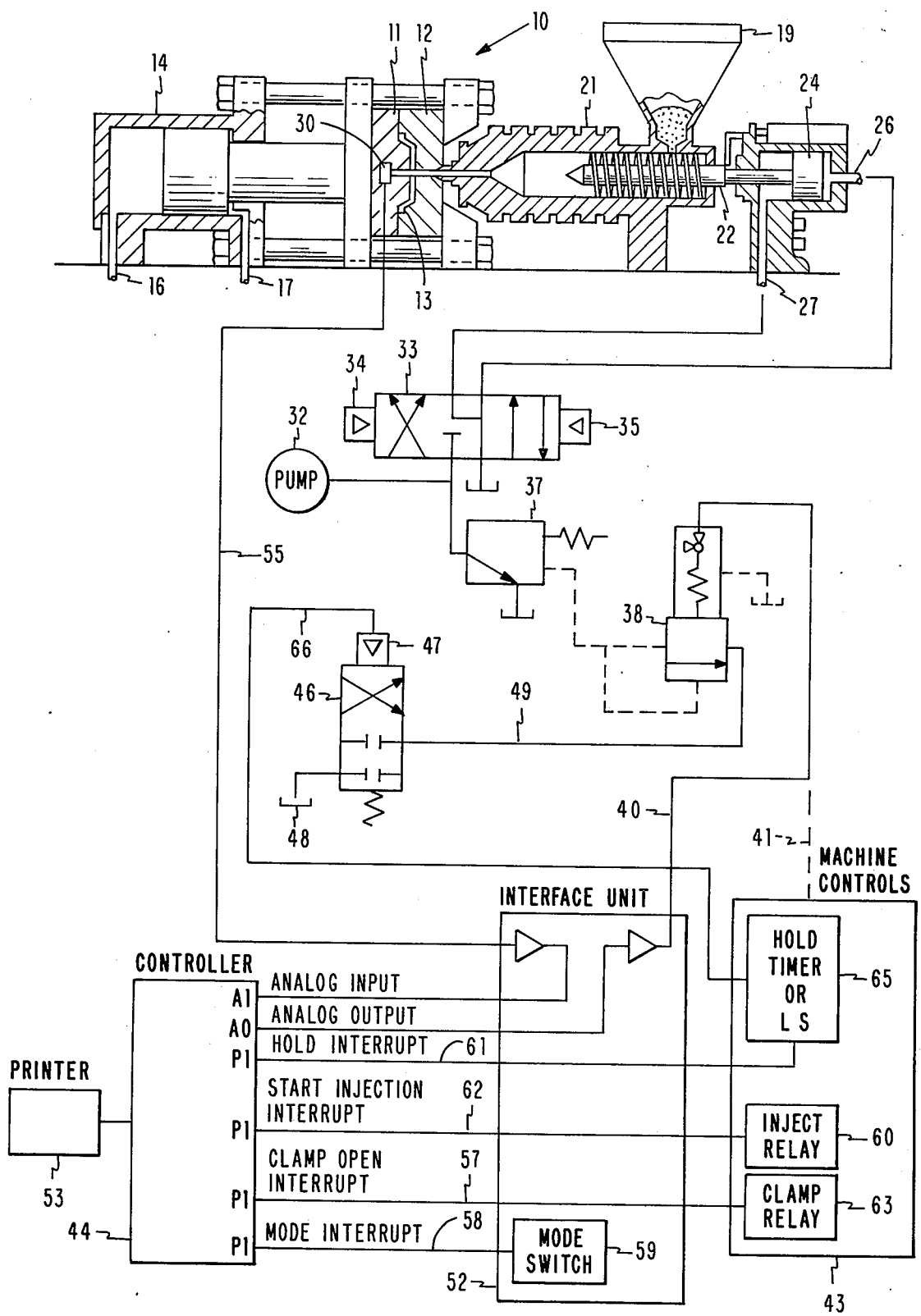
FIG. 1 is a pictorial schematic diagram of a control system embodying the invention.

In FIG. 1 a molding machine 10 includes a pair of mold sections 11 and 12 which define a mold cavity 13 for forming parts. The mold sections are clamped together or opened by a hydraulic cylinder 14 which is closed by hydraulic fluid supplied through line 16 and opened by hydraulic fluid introduced through line 17. Plastic resin is fed from a hopper 19 into an injection barrel 21 wherein the resin is heated to form a plasticized melt. The plasticized material is driven into mold cavity 13 by ram 22 which is driven through injection and retraction cycles by an injection cylinder 24. The melt is forced into the cavity by supplying high pressure hydraulic fluid through line 26 and the ram 22 is retracted by the application of hydraulic fluid pressure through line 27. The pressure of plasticized melt in mold cavity 13 is sensed by a cavity pressure sensor 30 which commonly takes the form of a strain gage sensing mechanism associated with an ejecter pin whereby the analog signal produced can readily be sensed as a pressure value knowing the cross sectional area of the pin.

Hydraulic fluid is supplied to the press 10 by a pump 32. A directional control valve 33 is shown in a nonactuated position. Actuation of solenoid 34 moves valve 33 to the right of the illustrated position to cause high pressure hydraulic fluid from pump 32 to be supplied on line 26 thereby effecting injection by driving ram 22 forward in barrel 21. When solenoid 35 is actuated and solenoid 34 deactivated, valve 33 is moved to the left of the illustrated position to supply hydraulic fluid through line 27 to retract ram 22. The hydraulic fluid pressure exerted in the system by pump 32 is controlled by two valves 37 and 38. Valve 37 is a manually controlled relief valve and valve 38 is an electrically controlled relief valve which may be variably positioned by an analog signal on line 40 or may be closed by an overriding signal on line 41 from machine controls 43. Relief valve 37 is set at a high pressure to provide the higher primary injection pressure and electrically controlled relief valve 38 is utilized to effect a lower secondary holding pressure during a subsequent cycle portion. Valve 46 is used to perform hydraulic cutover from the initial elevated pressure injection portion of the cycle to the subsequent reduced pressure holding or packing portion of the molding cycle. In the position shown, valve 46 interrupts the connection between line 49 and drain tank 48 to prevent control action by valve 38 thereby providing for the injection cycle portion. When solenoid 47 is actuated, hydraulic cutover is performed as valve 46 moves downward from the position shown in FIG. 1 placing drain line 49 in communication with drain tank 48 and making valve 38 active to control the reduced pressure holding cycle during which pressure correction can be effected by a varying analog signal on line 40.

System control is effected by controller 44 which operates through an interface unit 52 to control the system or a printer 53 to print out error messages or statistical data relative to production and operating conditions.

The controller 44 receives analog signals from the cavity pressure sensor 30 on line 55 and may issue analog output commands to the servoelectric valve 38 on line 40. A cycle may be initiated when the signal on line 57 is indicative that the clamp or mold sections are closed. The signal on data path 58 controls the mode switch 59 to place the system in control mode. The two stage cycle of operation is initiated by a signal on data path 62 causing solenoid 34 to move valve 33 to the right as shown as inject relay 60 is actuated. When the process parameter which determines the time of hydraulic cutover is satisfied, the timer or limit switch 65 of machine controls 43 causes a hold interrupt to occur on data path 61 and a signal on line 66 to actuate solenoid 47 causing valve 46 to move downward thereby initiating the holding cycle during which the reduced holding pressure is maintained on ram 22. A clamp open interrupt on line 57 terminates the cycle and causes clamp relay 63 to open the mold. The machine controls 43 include a switching device 65 for effecting hydraulic cutover or staging of the press by a timer switch that cuts over at a predetermined time after start of injection or a limit switch actuated by a predetermined ram position.

Figure 2:
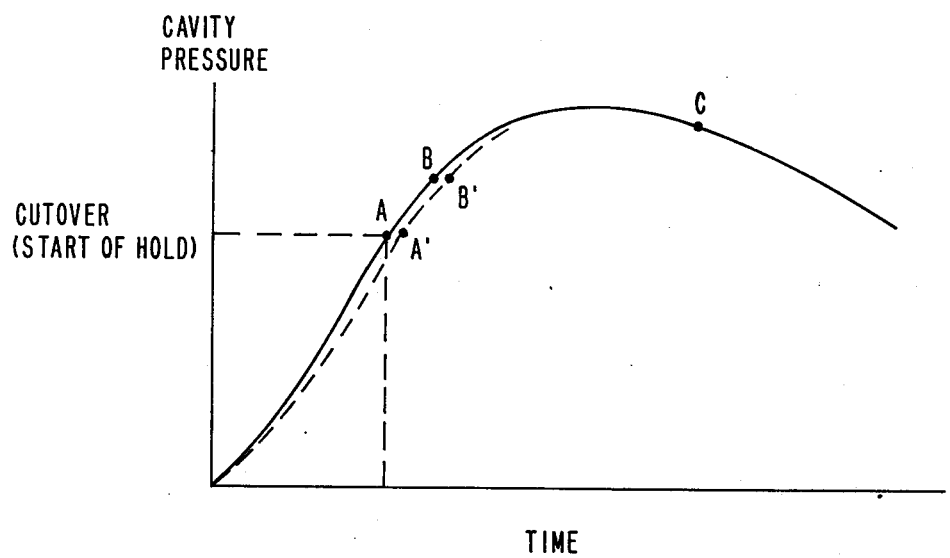
FIG. 2 is a graph depicting typical mold cavity material pressure curves for an injection molding cycle wherein the ordinate is in terms of cavity pressure and the abscissa is in units of time.

The process control technique of the present invention is shown and described hereafter as a same cycle control for correcting the holding pressure during the current cycle by averaging a selected number of readings beginning at start of hold, point A in FIG. 2, and terminating at point B. The solid line curve represents the reference profile and the dotted line curve a subsequent cycle sensed profile. The sensed pressure values are accumulated and averages from point A' to point B' and the average so obtained is compared to the reference check point value. Immediately following the performance of the algorithm to determine the correction and generate an analog signal, the holding pressure is increased to cause the holding pressure curve following B' to approach the solid line reference curve.

A second reference or setpoint is established by accumulating and averaging cavity pressure from A to C for purposes of a further subsequent cycle correction. The values accumulated and averaged during subsequent cycles between the events corresponding to points A and C are compared and further analog signal corrective action is taken with respect to valve 38. Although such correction is effected during the same cycle shortly after the event represented by point C (15 readings past the maximum pressure value in the illustrated embodiment) such corrective action occurs at too late a time in the molding cycle to have a significant effect during the current hold operation and is therefore more practically identified as a next cycle or subsequent cycle control. It will be noted that in the described embodiment the readings between points A and B were utilized both for the checkpoint same cycle control and the setpoint subsequent cycle control.

In initiating the control technique including same cycle control, there are two machine cycles prior to implementing the control mode. During the first cycle the number of readings between the events of points A and C is determined and the checkpoint established. The checkpoint is normally some fraction of the total number of readings such as between fifteen and twenty-five percent thereof. During the second of these cycles the checkpoint and setpoint reference values are established and the alarm and dead bands determined. With respect to both reference values, a range is established within which no corrective action will be taken and a second, significantly greater range is established with respect to which if the sensed value falls above or below the range an alarm will be triggered, an out of range message generated, and no corrective action taken. The wider out of range band is established to prevent the system from continuing to correct under conditions where a pressure correction is ineffective in solving the problem. For example, if the runner or gate leading to the cavity is blocked by frozen plastic material that was not removed from a previous cycle the proper corrective action is not to increase system hydraulic pressure driving the ram based on a lack of cavity pressure as material is prevented from reaching such mold cavity.

Figure 3:
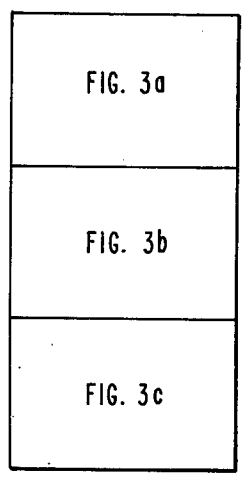
FIGS. 3a, 3b and 3c combine to illustrate a flow diagram depicting the process control of the present invention.
Figure 3A:
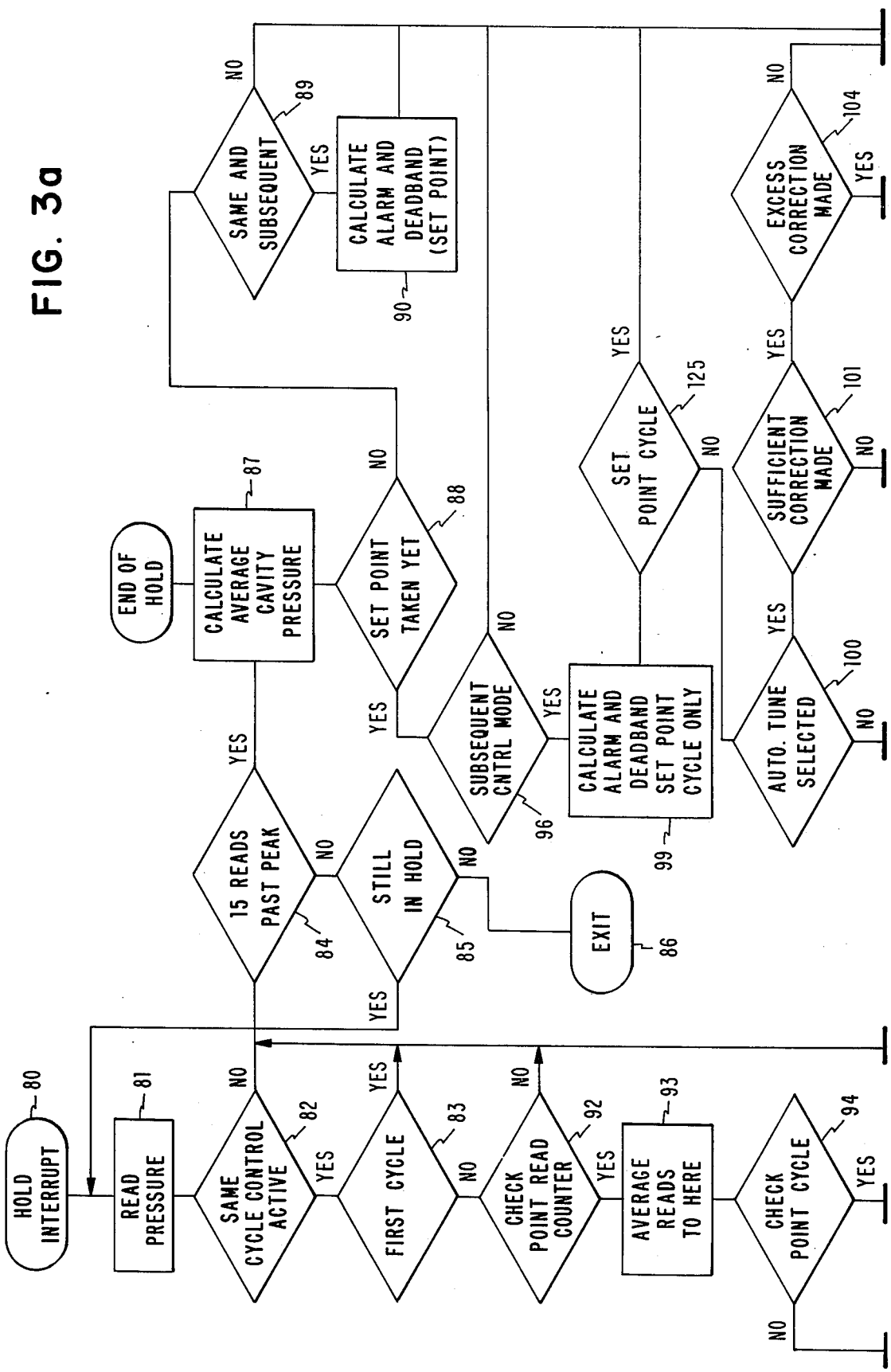
Figure 3B:
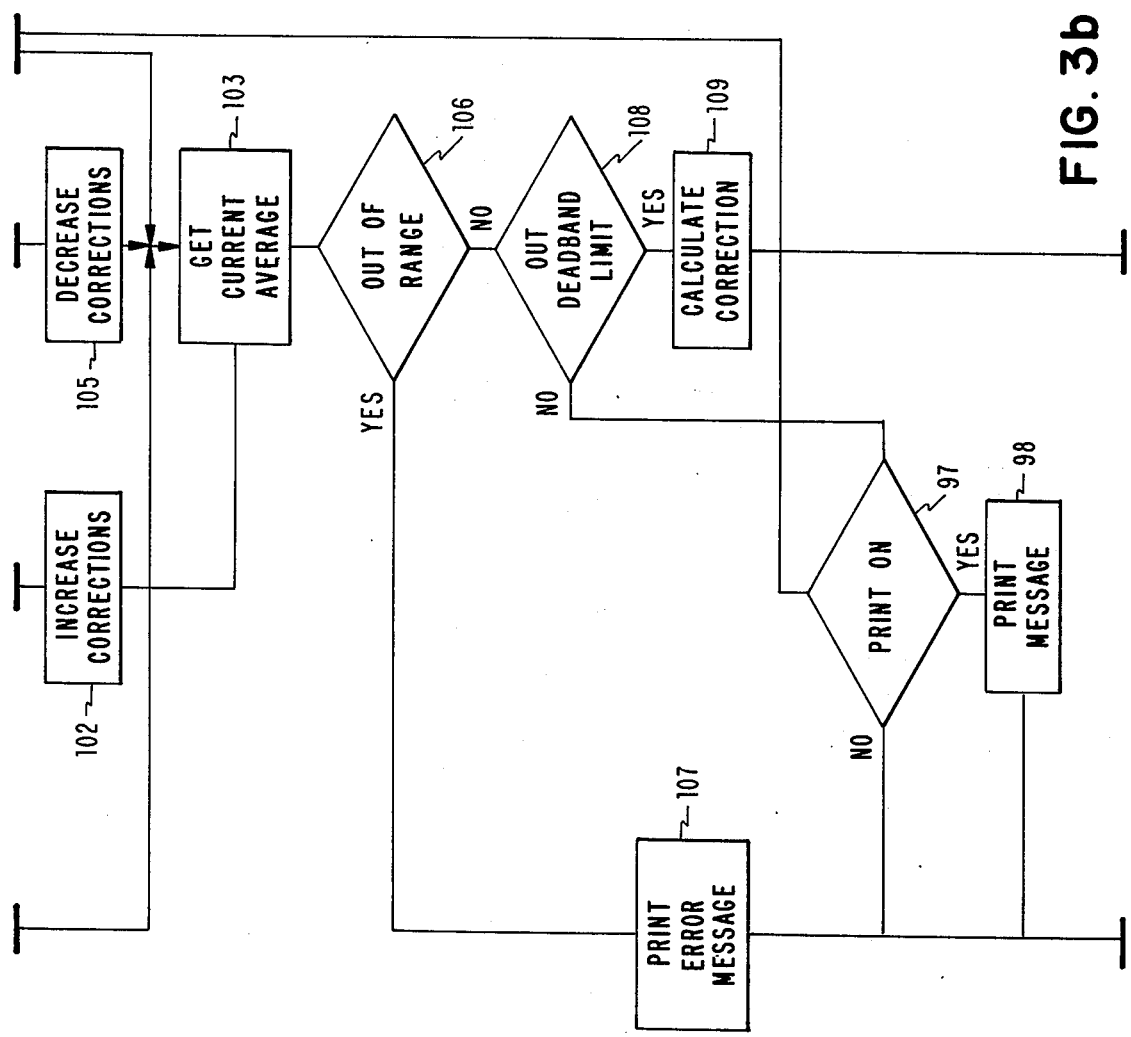
Figure 3B:
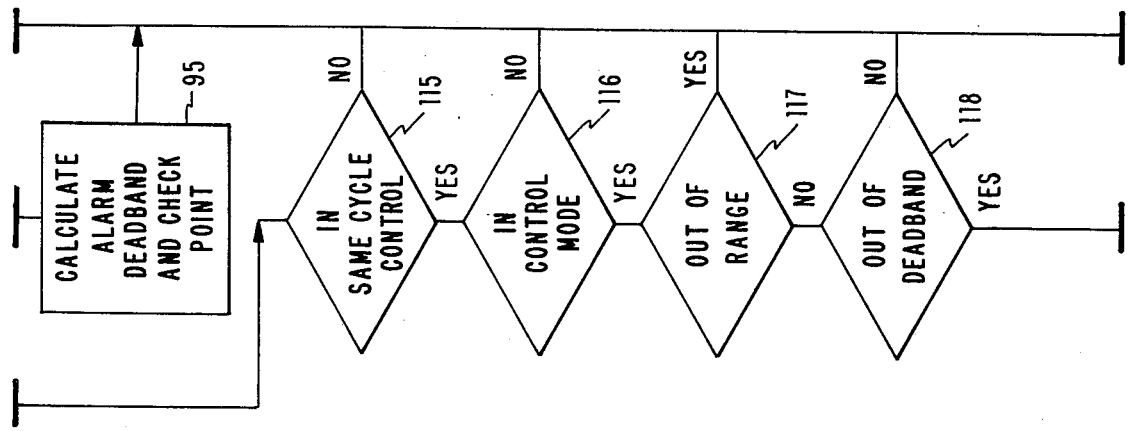
Figure 3C:
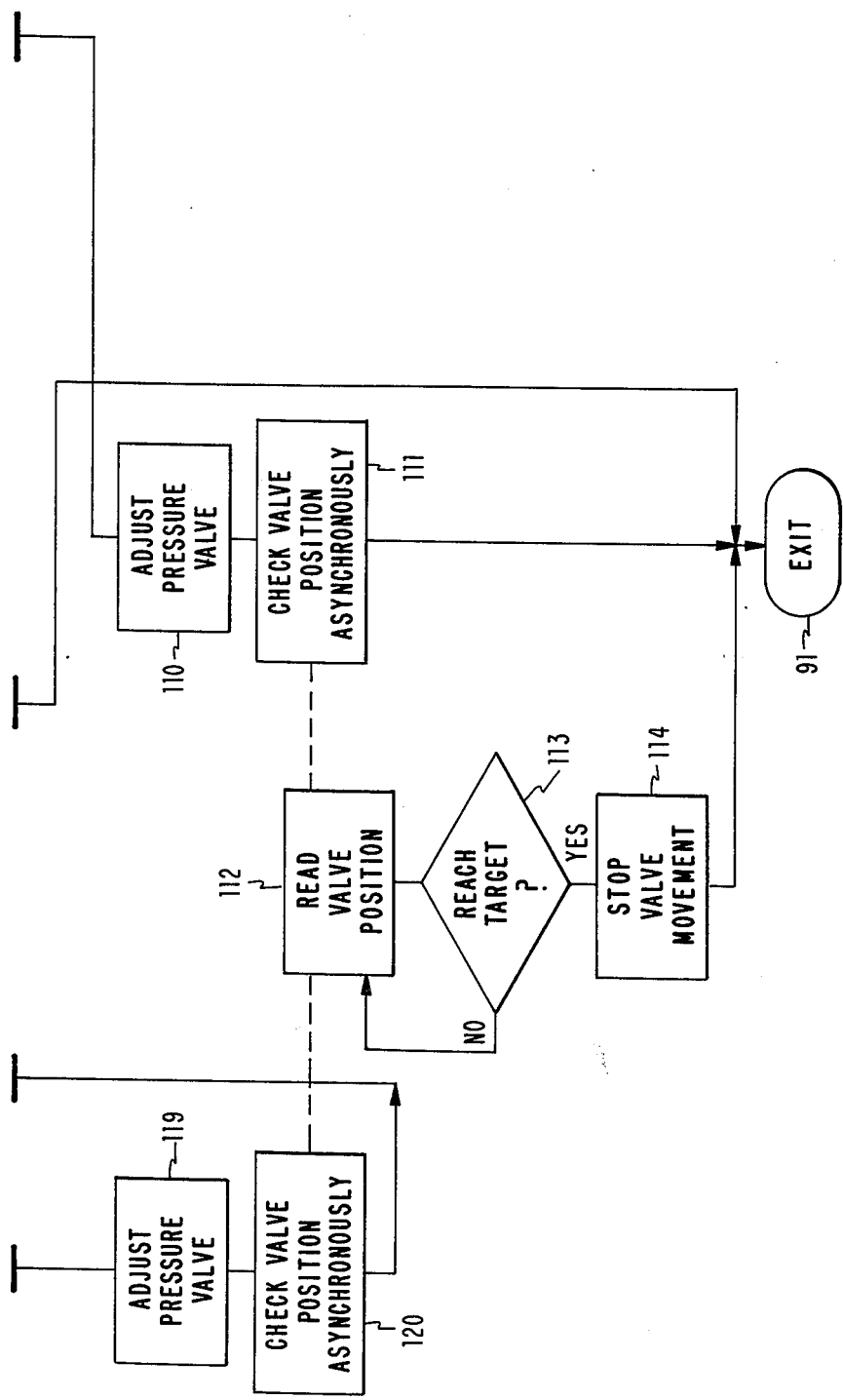

As illustrated in FIG. 3, which includes the composite flow diagram of FIGS. 3a, 3b and 3c, the control cycle commences with the hold interrupt at block 80. During the first cycle the routine proceeds to read the cavity pressure at block 81, determines at block 82 that same cycle control is active and at block 83 determines that this being the first cycle, the routine moves to block 84. If the current reading is not 15 reads past the maximum reading, and it is determined at block 85 that the cycle is still in hold, the routine returns to block 81 for another cavity pressure reading. Unless an "end of hold" interrupt should occur, the routine continues to cycle through blocks 81 through 85 taking cavity pressure readings until 15 readings past the maximum are achieved as indicated at block 84, at which time the average cavity pressure is calculated at block 87 and at block 88, since the setpoint has not yet been taken, the routine proceeds to the decision of block 89. If the present control does not include subsequent cycle, the routine proceeds directly to block 97, but if the subsequent cycle is included, the next procedure is to calculate the alarm band and dead band at block 90 which relate to the setpoint reference value for subsequent cycle correction. Thereafter it is ascertained whether the print command is on, and if so, the indicated messages are printed out prior to terminating the routine at exit 91.

At the time of the hold interrupt during the second cycle the routine again initiates at block 80 and proceeds to take a cavity pressure reading at block 81 and at block 82, the same cycle control being active, proceeds to block 83 where it will be determined that this is not the first cycle. At block 92 following each read but the one read during the cycle when the checkpoint count is achieved the routine will progress through blocks 84 and 85 and return to block 81 to take the next successive cavity pressure reading. When the pressure reading indicative of the checkpoint read count is reached, the routine will progress from block 92 to block 93 where the reads subsequent to the hold interrupt are averaged and at block 94 it is determined that the current cycle is the checkpoint cycle, the alarm band and dead band for the checkpoint will be calculated at block 95 following which the routine will again progress to block 84 and recycle until 15 reads past the maximum are achieved. The average of the accumulated cavity pressure readings following the hold interrupt is then calculated. Thereafter at block 88, since the setpoint has been taken, the routine will at decision block 96 determine whether the subsequent cycle control mode is active and if not, will immediately proceed to block 97 and to the routine exit after printing the required message at 98 if the requirement exists for printing the message. If at block 96 it is determined that the subsequent control mode is active, the routine at block 99 will proceed to calculate the alarm band and dead band, but only if the current cycle is the setpoint cycle. At decision block 125 it will be determined that the current second cycle is the setpoint cycle (the same cycle being active) and the routine proceeds to block 97 where if printing a message is indicated, such action will be taken before exiting the routine at block 91.

During the third and subsequent machine cycles with the same cycle control active the routine is entered commencing with the hold interrupt at block 80 and takes recurring readings at block 81 by a recurring progression through blocks 81, 82, 83, 92, 84 and 85 until it is ascertained at block 92 that the checkpoint read count has been attained. During that read cycle the routine progresses to block 93 where the accumulated cavity pressure readings subsequent to the hold interrupt are averaged. The routine then progresses through block 94 to block 115 and being in same cycle control mode to block 116 and block 117. If the sensed average cavity pressure to the checkpoint when compared to the checkpoint reference is out of range, the routine proceeds to take another reading by returning to block 84. If not out of range it is determined at block 118 whether corrective action is to be taken. If the sensed average value to the checkpoint is within the dead band no action is taken and the routine returns to block 84 to continue cavity pressure readings if still in the hold cycle. If the value is outside the deadband, the routine proceeds to block 119 and an analog output command is issued to adjust the hydraulic pressure value.

This command signal is an open loop control signal transmitted to the valve. At block 120 a reading is taken to check the final position of the valve asynchronously for the purpose of checking the interface hardware. If an error in the final valve position is found, a correction is made in the analog output signal to correct for hardware error and assure that future valve movement will conform to the analog signal output thereto.

If instead of the open loop servoelectric valve shown herein, a motor driven potentiometer is utilized, the signal from block 119 turns on such motor driven potentiometer. Thereafter procession occurs around the loop defined by blocks 112 and 113 until the target position reached whereupon the command issued at block 114 terminates valve movement and this routine exits.

From block 120 the routine returns to block 84 to continue to take cavity pressure readings to 15 readings past the maximum unless earlier terminated by an end of hold interrupt. The average of sensed cavity pressures is calculated at block 87 and the setpoint has been taken the routine progresses to block 96. If not in subsequent control mode, the routine proceeds to block 97 and exit 91 as described hereinbefore.

In same and subsequent cycle control mode the routine advances through blocks 99 and 125 to block 100. At block 100 it is determined whether the "auto tune" is active and if not, the routine proceeds immediately to use the current average calculated at block 87. The subsequent cycle correction applied to correct the valve position takes the form of the error value (established by comparison of the sensed average value to the setpoint reference) multiplied by a constant divided by a scale factor. If the correction factor is insufficient, an increase may be effected by decreasing the scale factor and if the correction is too large, such may be decreased by increasing the scale factor. If the auto tune is selected a first test is made to determine whether sufficient correction has been made, if not, the corrections are increased at 102 and the routine proceeds to ascertain the current average at 103 while if sufficient correction has been made, a further test is made at block 104 to determine whether an excess correction has been made. If such decision is yes a decrease in the corrections is effected at 105 whereupon the routine proceeds to establish the current corrected average at 103. If both sufficient correction has been made at 101 then no excess correction is found to have been made at block 104, the routine proceeds to use the current average at block 103 in the same manner as if the auto tune had not been selected at block 100.

The current average ascertained at block 103 is compared to the setpoint value and if found at block 106 to be out of range, the routine may proceed to take further action and to print an error message at 107 followed by exit at block 91.

If an out of range condition exists the correction will always be set to zero, but it is not necessarily desirable that a default be made to occur and the program forced out of control mode. Since an out of range condition may be caused by a nonrecurring transient condition, it is the usual practice to require a repetition of out of range cycles before printing an error message and forcing the system out of control mode. The normal practice is to initiate such an error message and default condition only after the third successive out of range comparison. If not out of range, the routine at block 108 determines whether the average is out of the dead band limit and if not, no correction is to be made, causing a determination to be made as to whether the print is on and if so, to print the required message prior to exiting at block 91. If a comparison at block 108 indicates that the current average is outside the limit and a correction is to be made the same is calculated at block 109 whereupon the routine proceeds to block 110 where the valve adjustment command is generated and the valve position being checked asynchonously at block 111 for interface hardware error prior to exit at block 91. If the control system is used to control a motor driven potentiometer type device using closed loop feedback for checking purposes, the command from block 110 is supplied to block 112 and control is effected as described previously in conjunction with the checkpoint correction by cycling through the loop established by blocks 113 and 114 until a target is reached whereupon further valve movement is stopped by action at block 114 prior to exit at block 91.

While the invention has been particularly shown and described with reference to a preferred embodiment thereof, it will be understood by those skilled in the art that various changes in form and details may be made therein without departing from the spirit and scope of the invention. For example, the apparatus and technique are applicable to control either the injection or holding cycles of a multiple stage press and are equally applicable to the control of a single stage press.

I claim:

1. An injection molding machine including hydraulically driven reciprocating ram for injecting plasticized material from an injection barrel into a mold cavity and a control system comprising;

hydraulic pressure fluid circuit means operable to advance said ram;

pump means operatively connected to said fluid circuit means to deliver hydraulic fluid to said ram;

electrically responsive valve means connected to said fluid circuit means for controlling delivery of hydraulic fluid from said pump means to said ram;

a sensor responsive to the fluid pressure of material within said mold cavity;

sensing means connected to the output of said sensor for periodically sensing signals which are a function of cavity pressure encountered by said sensor;

accumulating and averaging means connected to said sensing means for receiving and averaging a series of signals representative of cavity pressure commencing with the attainment of a predetermined cavity pressure and terminating with a second event to produce a sensed average value;

means to produce a reference pressure value;

comparison means operable to compare said sensed average value with said reference value to generate an error signal;

means operable to control said valve means for modifying the hydraulic system pressure driving said ram during the same cycle of machine operation following said second event, by an increment which is a function of the sign and magnitude of said error signal;

error signal compare means connected to receive said error signal and generate an output signal when said error signal exceeds a predetermined magnitude; and disabling means responsive to said error signal compare means which inhibits alteration of the fluid pressure driving said ram by said means for modifying the hydraulic system pressure, during a cycle in which a signal is generated by said error signal compare means.

2. The injection molding machine of claim 1 wherein said sensing means senses the output of said sensor at uniformly spaced intervals of time and said second event occurs at a predetermined number of said intervals of time subsequent to said attainment of a predetermined cavity pressure.

3. The injection molding machine and control system of claim 1 wherein said machine is a two-stage molding press having an initial injection stage during which a first fluid pressure is applied to said ram and a subsequent holding stage during which a second fluid pressure which is less than said first fluid pressure is applied to said ram and further comprising;

control means connected to said sensing means and said valve means for issuing a cutover signal to said valve means for reducing said fluid pressure from said first pressure to said second pressure upon said cavity pressure attaining a predetermined value, and;

said cutover signal constitutes said first event.

4. An injection molding machine including a hydraulically driven reciprocating ram for injecting plasticized material from an injection barrel into a mold cavity and a control system therefore comprising;

hydraulic pressure fluid circuit means for advancing said ram;

electrically responsive valve means for controlling said hydraulic pressure fluid circuit means;

a sensor responsive to the fluid pressure of material within said mold cavity;

sensing means connected to said sensor to read said mold cavity pressure at uniformly spaced time intervals;

first accumulating and averaging means for averaging a first series of cavity pressure readings beginning from a first event and terminating at a second event to generate a first sensed average pressure value;

second accumulating and averaging means for averaging a second series of cavity pressure readings beginning at a third event and terminating at a fourth event to generate a second sensed average pressure value;

means to produce a first reference pressure value;

first compare means for comparing said first sensed average pressure value to said first reference pressure value to produce a first error signal;

first modification means connected to said electrically responsive valve means for varying the hydraulic system pressure driving said ram during the same cycle of machine operation by an increment which is a function of the sign and magnitude of said first error signal;

means to produce a setpoint reference pressure value;

second compare means for comparing said second sensed average pressure value to said setpoint reference value to produce a second error signal; and second modification means connected to said electrically responsive valve means for varying the hydraulic system pressure driving said ram during a subsequent cycle of machine operation by an increment which is a function of the sign and magnitude of said second error signal.

5. The injection molding machine and control system of claim 4 wherein said machine is a two stage press further comprising hold interrupt means responsive to a selected cycle parameter reaching a predetermined value for generating a cutover signal which actuates said electrically responsive valve means to reduce the pressure of said hydraulic pressure fluid circuit means from a primary injection pressure to a reduced secondary holding pressure.

6. The injection molding machine and control system of claim 4 further comprising;

initiating means for starting said first series of cavity pressure readings and said second series of cavity pressure readings from a common event and the number of cavity pressure readings accumulated at the occurrence of said second event does not exceed one fourth the number of such cavity pressure readings accumulated upon the occurrence of said fourth event.

7. The injection molding machine and control system of claim 5 further comprising;

recognition means for identifying said cutover signal generated by said hold interrupt means as said common event which activates said initiating means.

* * * * *